No. 12,756. REISSUED MAR. 3, 1908.
E. J. BURKE.
TELEPHONE SYSTEM.
APPLICATION FILED OCT. 25, 1907.
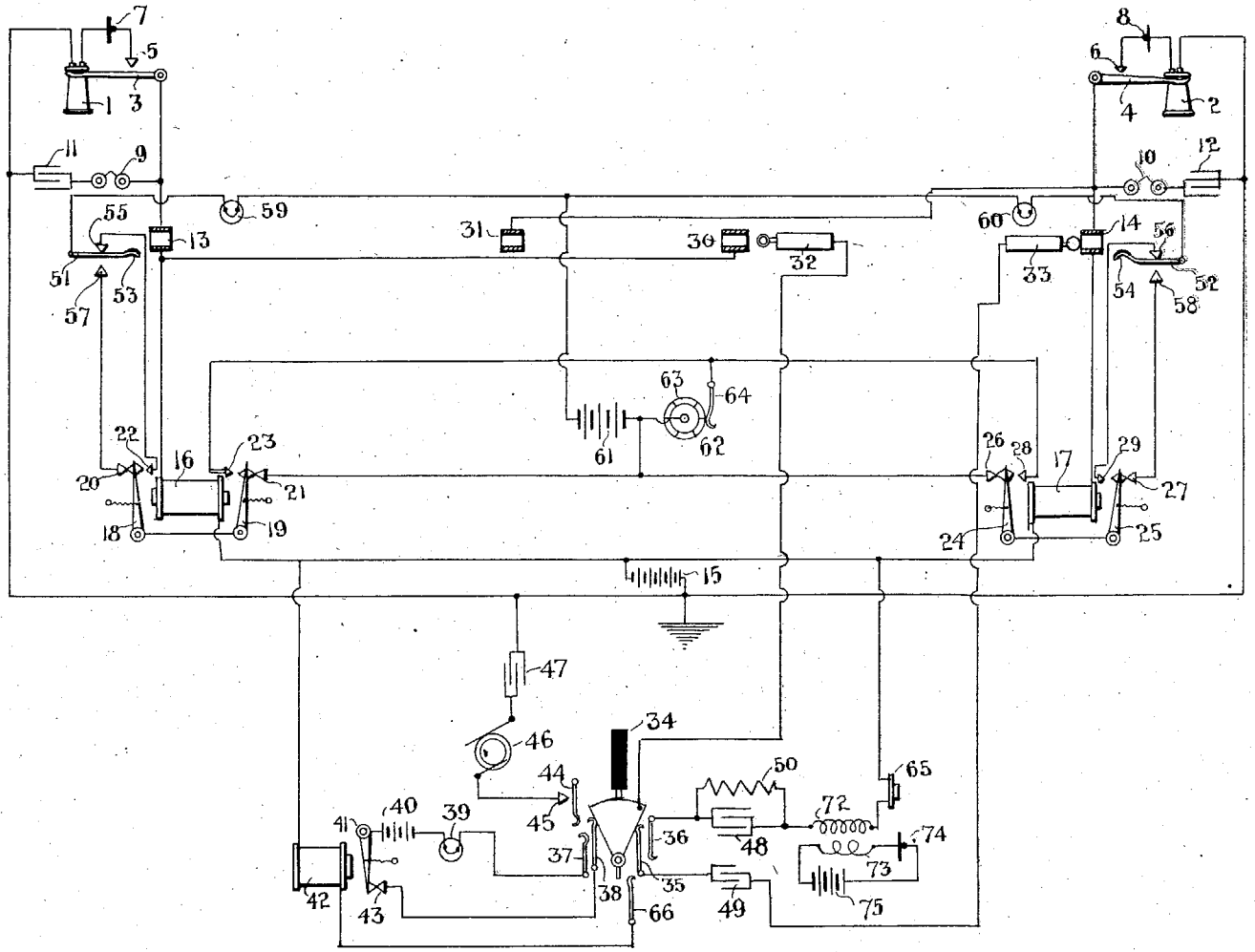
WITNESSES
V. H. Hill
Gilbert X. G. McDuff
INVENTOR
Edward J. Burke
BY
Frank F. Crampton
ATTORNEY.

UNITED STATES PATENT OFFICE.

EDWARD J. BURKE, OF BROOKLYN, NEW YORK.

TELEPHONE SYSTEM.

No. 12,756. Specification of Reissued Letters Patent. Reissued March 3, 1908.

Original No. 853,002, dated May 7, 1907, Serial No. 282,731. Application for reissue filed October 25, 1907. Serial No. 399,233.

*To all whom it may concern:*

Be it known that I, EDWARD J. BURKE, a citizen of the United States, and a resident of borough of Brooklyn, New York, county of New York, have invented new and useful Improvements in Telephone Systems, of which the following is a specification.

My invention relates to telephone systems and it has for its object to provide a multiple board central system having each set of jacks connected together by a single line and connecting plugs each pair being connected by a single strand.

The invention consists in other features set forth in the following description and disclosed in the drawings and claimed in the claims.

Referring to the drawings the figure illustrates diagrammatically a multiple board central system embodying one form of my invention.

Referring to the figure 1, 2 are receivers, 3, 4 are receiver hooks, 5, 6 are contacts which are adapted to close connections with the receiver hooks 3, 4. 7, 8 are transmitters. 9, 10 are bells. 11, 12 are condensers. These devices are all located at the subscriber's station and are connected in the manner well known in the art.

The subscribers' stations are connected on one side to the sleeves 13, 14 of the jacks located at the central station and on the other side to the battery 15. The sleeves 13, 14 are connected to relay magnets 16, 17. The relay magnet 16 has two armatures 18, 19 which are adapted normally to close connection with the contacts 20 and 21 and when the magnet 16 is energized to close connections with the contacts 22 and 23. The magnet 17 has the parts 24, 25, 26, 27, 28, 29 which correspond to the parts 18, 19, 20, 21, 22, 23 of magnet 16. The magnets 16 and 17 are connected to one side of the battery 15. The other side of the battery is connected to the subscriber's stations.

The connections with the subscribers' stations and the jacks 13 and 14 are multiplied to different sections of the multiple board in the manner well known in the art. Jack 13 is connected to jack 30 and so on to the other sections. Only two sections are shown in the drawing to illustrate the system. Jack 14 is connected to jack 31 and to other jacks of other sections. Each section in the system illustrated is provided with a plurality of plug circuits. The plugs 32 and 33 are adapted to be inserted in the sleeve of the jacks. The plugs are connected by a single strand to the key 34. The key 34 is adapted to connect an operator's talking circuit, a ringing circuit and a lighting circuit to the plugs. 35 is a spring contact which is normally in contact with the key 34. Contact 36 is connected to the operator's talking circuit and is adapted to make contact with the contact 35 when the key 34 is thrown to the right. Contacts 37 and 38 are closed when the key 34 is swung to the left. The contacts control the current passing through the lamp 39, battery 40, and the armature 41 of the magnet 42 and the contact 43. A spring contact 44 is also provided which comes into operation when the key 34 is thrown over to the left to a still further position than that required to close the contacts 37 and 38. When in this last position the key 34 closes a connection with contact 45 and generator 46 which produces a ringing current. The contact springs are such that the key returns to a position that will keep contacts 37, 38 closed. A condenser 47 is connected to the subscribers' lines and to the generator 46 which is used for producing alternate or ringing currents. The generator circuit is completed through the switch 34 to the plug 32 which upon calling is connected to the opposite side of the subscriber's line to which the condenser is connected. The battery 15 is also connected to opposite sides of the subscribers' lines but short circuit of the battery 15 through the generator is prevented by the condenser 47. Condenser 48 permits the voice currents from central operator to pass readily around resistance shunt 50 out by way of cord attached to plug 33 to the calling subscriber. Coil 50 would otherwise act as a high impedance to the voice currents and thereby reduce their efficacy. The function of resistance 50 is to diminish the flow of battery current from battery 15 through central's head receiver 65 at the moment of central making a busy test and also of eliminating the busy test click from the calling subscriber's telephone receiver. Condenser 49 also permits the passage of voice currents to pass through the cord of plug 33 to the calling subscriber's phone and thence back to the other side of central operator's induction coil. At the same time it prevents any steady current of battery 15 from flowing through cord of plug 33. Resistance 50 reduces the amount of flow of current through the receiver 65.

When the plugs are inserted in the jacks, the tips of the plugs are adapted to operate upon the spring contacts 51 and 52. The spring contacts have insulated portions 53, 54 which prevent any connection with the tips of the plugs. The contacts 51 and 52 break connection with contact 55 and 56 and make connection with 57 and 58. The contacts 55, 56 and 57, 58 are connected with certain of the contacts 20, 22, 27 and 29. All of the contacts of the system which correspond with contacts 51 and 52 are connected together through the lamps 59, 60 which are associated with and located in proximity to the jacks of the subscribers. The lamps are connected to the battery 61 which is in turn connected to the contacts of the system which correspond to the contacts 21 and 26. The battery is also connected to a make and break device 62. The form of make and break device here illustrated is a segmental wheel 63 which is adapted to make contact with the spring contact 64. The spring contact 64 is connected with all the contacts of the system which correspond to the contacts 23 and 28.

In the operation of the system when the subscriber lifts the receiver 2 a connection is closed from the battery 15, magnet 17, sleeve 14, hook 4, transmitter 8, receiver 2, to the battery 15. This energizes magnet 17 and causes the armatures 24 and 25 to separate from the contacts 26 and 27 and make contact with contact 28 and 29. This closes a current from the battery 61 through 52, 56, 29, 25, 24, 28, 64 make and break device 63 to the battery 61. This causes a pulsating current to pass through the lamp 60 which indicates to the operator that the subscriber connected with a jack in the vicinity of the flashing lamp desires to be connected to some other party. The operator inserts plug 33 into jack 14 and throws key 34 over to the right and inquires what number is wanted. When the operator ascertains the number desired she touches the tip of the plug 32 to the jack 30 to ascertain whether the subscriber called is busy. If the subscriber called for is busy, the receiver 1 has been removed from the hook 3 and a connection between the battery 15 and the sleeve of the jack closed. The sleeve has then a certain potential from the battery 15 and the resistance magnet 16 is shunted through the tip of plug 32, key 34, contact 36 and telephone 65 to the battery 15. If the subscriber called for is not busy, the operator inserts the plug 32 into the sleeve 30 and at the same time throws the key 34 over to the left closing first contacts 37, 38 and then 44, 45. This causes a ringing current to flow from the generator 46 through 45, 44, 34, 32, 30, 9, 11. At the same time that the operator throws the key 34 to the left, a connection is closed through the contact 66 to the magnet 42. A circuit is closed from the battery 15, hook 3, sleeve 30 through the plug 32, key 34, contact 66 and low resistance magnet 42, battery 15, which operates to shunt the high resistance magnet 16 which is connected from the sleeve 13 to the same side of the battery 15. During the time of the conversation between the two subscribers, the key 34 is left in an intermediate position, namely, in such a position that contacts 37 and 38 are closed and so that the body of the key is in connection with contact 66 and contact 35. In this position contacts 36 and 44 are disconnected from the key 34. When the subscribers have completed their conversation and the receivers are hung on the hook the circuit through the magnets 42 and 17 are broken and the armatures 41 and 25 close the circuits 43 and 27. This completes the circuit from the battery 61 through the lamp 60, contact 52, 58, 27, 26 to the battery 61 which permits a constant flow of current through the lamp 60 and causes the lamp to light with a constant glow. At the same time the circuit is closed through lamp 39, contact 37, 38 and 43 to the battery 40 which also causes lamp 39 to light with a constant glow. The lighting of the lamps 39 and 60 indicate to the operator that the parties are through with their conversation and desire to be disconnected. The plugs are then withdrawn from the jacks.

The invention may be varied and equivalents may be substituted by those skilled in the art without departing from the spirit thereof.

What I claim as new and desire to secure by Letters Patent is as follows:

1. In a multiple board central system the combination of a plurality of subscribers' stations, a plurality of jacks connected together and to each of the said subscribers' stations by a single line, a pair of plugs connected together by a single strand, a lamp associated with each of the said sets of jacks and means for causing the said lamps to produce lights of different characters to indicate when a connection is desired and when the conversation is completed.

2. In a multiple board central system the combination of a plurality of subscribers' stations, a plurality of jacks connected with each subscriber's station, a lamp at all times controlled by the subscribers' instruments and associated with each set of the said jacks, a pair of plugs for connecting the said jacks together, means for causing the said lamps to produce lights of a different character to indicate when a connection is desired and when the conversation is completed, a switch connected to the said plugs, a second lamp controlled by the said switch.

3. In a multiple board central system the combination of a plurality of subscribers' stations, a plurality of jacks connected together and to each station by a single line, a plurality of pairs of plugs for connecting the said stations together, each pair being connected together by a single strand, a lamp associated with each set of jacks, means for causing the said lamp to give lights of different characters to indicate when a connection is desired and when the conversation is completed, a switch connected to the said strand, a second lamp controlled by the said switch.

In testimony whereof, I have signed my name to this specification, in the presence of two subscribing witnesses.

EDWARD J. BURKE.

Witnesses:
HENRY MARX,
V. N. FELL.